(12) United States Patent
Parker

(10) Patent No.: US 11,643,152 B2
(45) Date of Patent: May 9, 2023

(54) AUTOMOTIVE VEHICLE WITH FOLDING TAILGATE

(71) Applicant: Rivian IP Holdings, LLC, Plymouth, MI (US)

(72) Inventor: Larry Parker, Bloomfield Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/557,779

(22) Filed: Dec. 21, 2021

(65) Prior Publication Data

US 2022/0119046 A1   Apr. 21, 2022

Related U.S. Application Data

(63) Continuation of application No. 16/899,076, filed on Jun. 11, 2020, now Pat. No. 11,214,318.

(51) Int. Cl.
   *B62D 33/027* (2006.01)
   *B60J 5/12* (2006.01)
   *B62D 33/037* (2006.01)

(52) U.S. Cl.
   CPC ............ *B62D 33/0273* (2013.01); *B60J 5/12* (2013.01); *B62D 33/037* (2013.01)

(58) Field of Classification Search
   CPC ...... B60J 5/12; B62D 33/027; B62D 33/0273; B62D 33/03; B62D 33/037
   USPC ............................................ 296/50, 51, 57.1
   See application file for complete search history.

(56) References Cited

U.S. PATENT DOCUMENTS

| | | |
|---|---|---|
| 5,685,594 A | 11/1997 | Harper |
| 5,876,086 A | 2/1999 | Lagrou et al. |
| 6,874,839 B2 | 4/2005 | Acker et al. |
| 8,740,279 B1 | 6/2014 | McGoff et al. |
| 9,994,263 B1 | 6/2018 | Richter |
| 2003/0122396 A1 | 7/2003 | Humphrey et al. |

(Continued)

FOREIGN PATENT DOCUMENTS

| | | | | |
|---|---|---|---|---|
| DE | 102004024607 A1 | * | 12/2005 | ............... B60J 5/12 |
| EP | 1215107 A1 | | 6/2002 | |
| FR | 2936757 A1 | * | 4/2010 | ............. B60R 19/40 |

OTHER PUBLICATIONS

English translation of DE 10 2004 024 607; retrieved via Patent-Translate located at www.epo.org. (Year: 2022).*

*Primary Examiner* — Jason S Daniels

(74) *Attorney, Agent, or Firm* — Clements Bernard Walker; Christopher L. Bernard

(57) ABSTRACT

An illustrative folding tailgate for an automotive vehicle includes a first wall portion and a second wall portion that are rotatably connected to one another. A first latch may be attached to the first wall portion and configured to engage with a complementary latch part at a first portion of a vehicle to lock the tailgate in a closed position. A guide member may be attached to the first wall portion and configured to move along a rail disposed at a rear of the automotive vehicle, the guide member configured to move along the rail in a manner constrained by the rail. A rotatable connection mechanism may be attached to the second wall portion and configured to attach to a second portion of a vehicle. The tailgate may be configured to open and close via folding movement of the first and second wall portions relative to one another.

20 Claims, 11 Drawing Sheets

(56) References Cited

U.S. PATENT DOCUMENTS

2006/0001288 A1    1/2006   Thiele et al.
2019/0185074 A1    6/2019   Morley et al.
2021/0245818 A1    8/2021   Van Norman et al.

\* cited by examiner

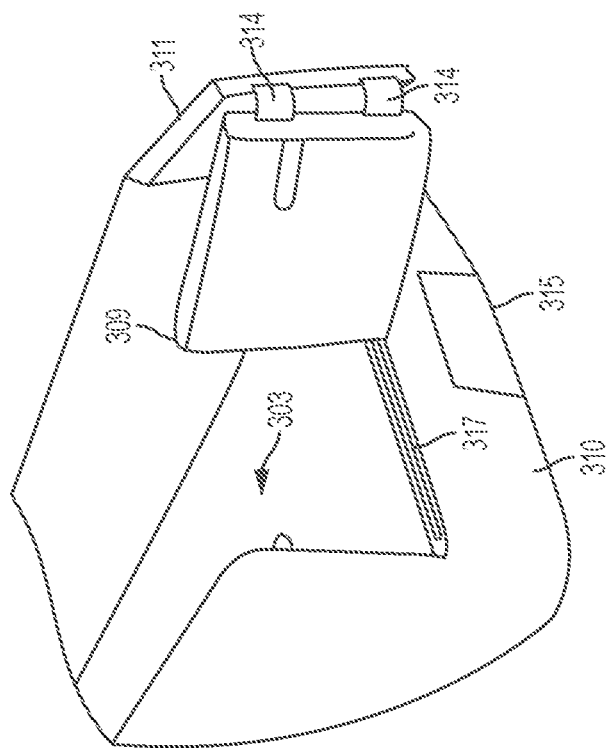
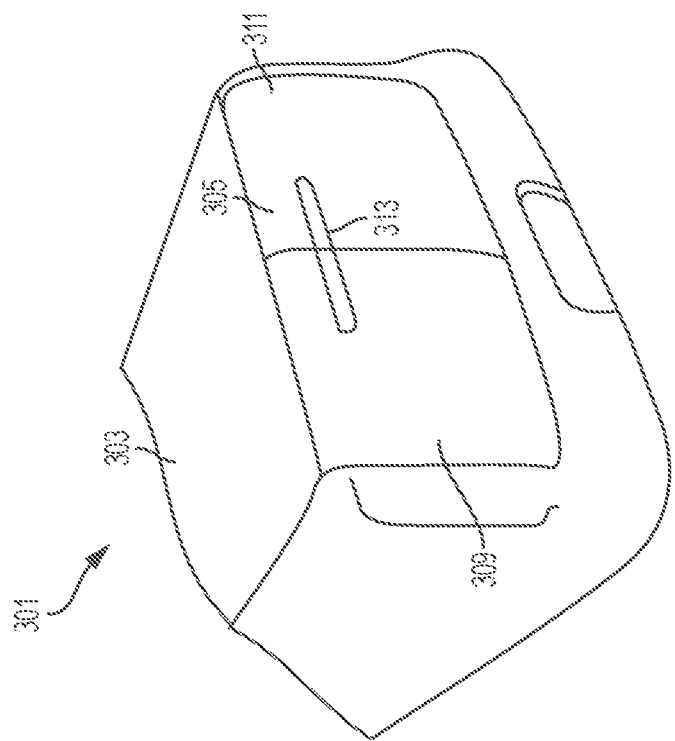
FIG. 3B
FIG. 3A

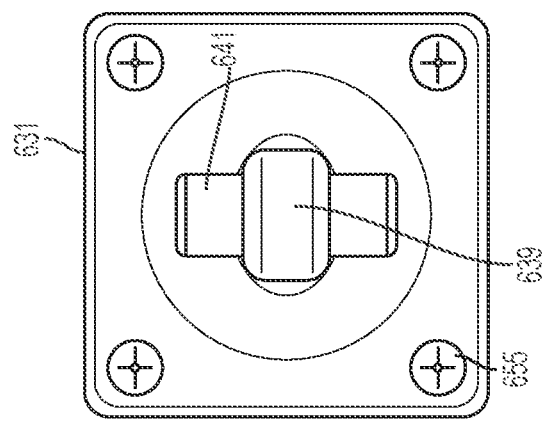
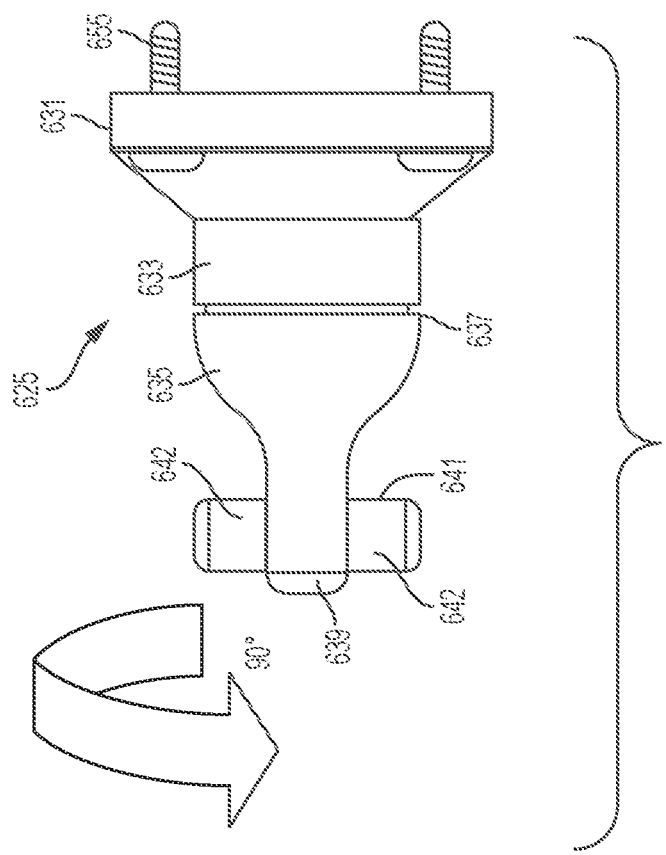
FIG. 6B
FIG. 6A

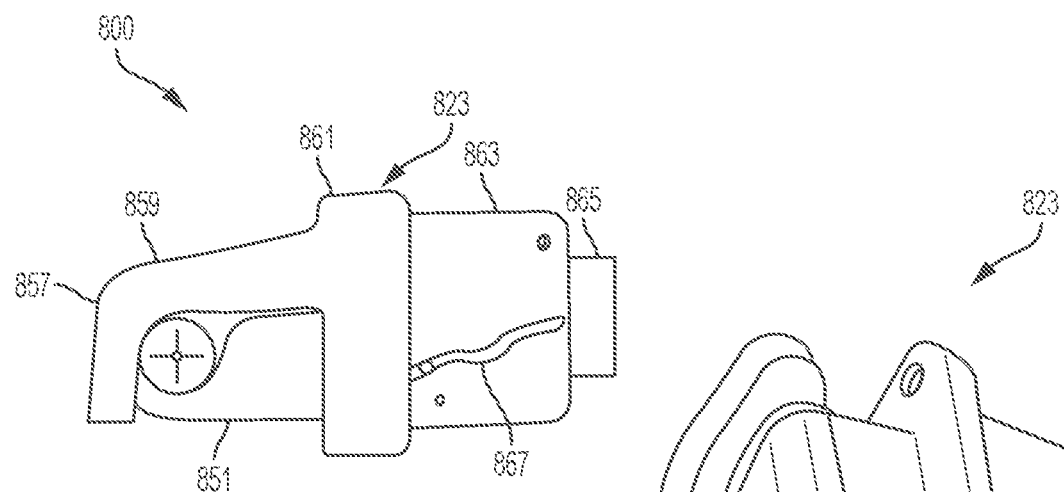
FIG. 8A
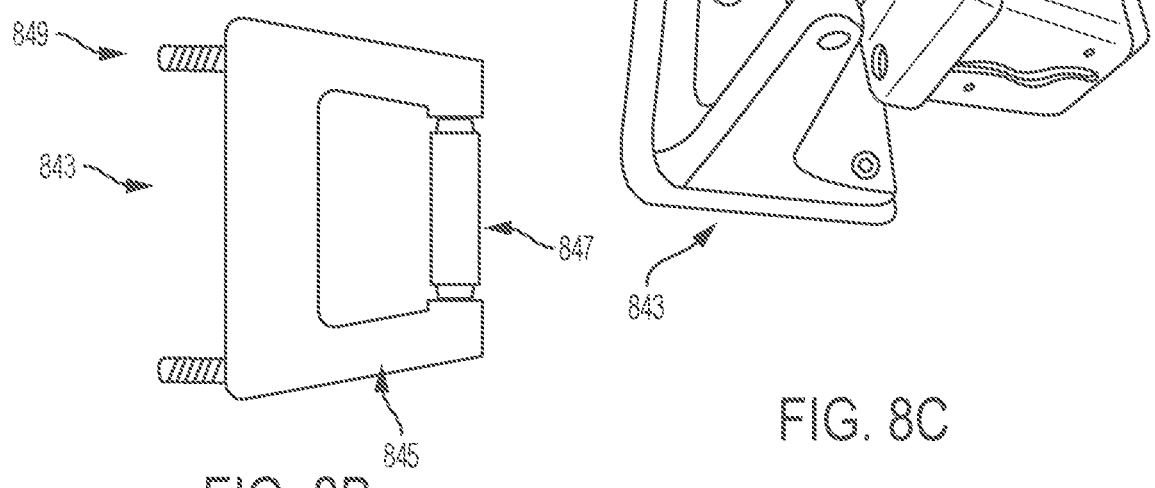
FIG. 8B
FIG. 8C

AUTOMOTIVE VEHICLE WITH FOLDING TAILGATE

CROSS-REFERENCE TO RELATED APPLICATION

The present disclosure claims the benefit of priority of co-pending U.S. patent application Ser. No. 16/899,076, filed on Jun. 11, 2020, and entitled "AUTOMOTIVE VEHICLE WITH FOLDING TAILGATE," the contents of which are incorporated in full by reference herein.

INTRODUCTION

The present disclosure relates to tailgates for automotive vehicles.

The statements in this section merely provide background information related to the present disclosure and may not constitute prior art.

Automotive vehicles typically have a storage area, which may be typically located in the rear of the vehicle. Some types of automotive vehicles, including trucks such as without limitation pickup trucks, may have an open storage area, referred to as a storage bed, cargo bed, or simply a bed. In such vehicles, access to the bed is provided via a tailgate located at a rear portion of the bed, which opens by rotating backward and downward to rest in a horizontal position. A tailgate is connected to the vehicle by hinges at opposing sides of the base of the tailgate to allow for opening and closing.

Referring to FIG. 1, a currently-known vehicle 101 includes a conventional tailgate 105. The vehicle 101 includes a bed 103 and the conventional tailgate 105. The conventional tailgate 105 has one or more hinges 107. The hinges 107 allow the tailgate 105 to rotate about 90 degrees or so from a closed position (shown in FIG. 1) out and away from the bed 103 to an open position where the tailgate 105 is disposed horizontally. The tailgate 105 encloses an area of the bed 103 when the tailgate 105 is in an upright (that is, closed) position. When the conventional tailgate 105 is in a down (that is, open) position, its then rear facing edge protrudes rearward from the vehicle bed 103 by a distance—such as, for example, 16-24 inches or so—thereby entailing a user to stand such a distance away from the bed 103 at the rear in order to access cargo in the bed 103.

That is, in currently-known tailgate designs, an open tailgate 105 can help contribute to acting as an obstacle to accessing the bed 103 because the open tailgate 105 can extend outward in a rearward direction, thereby contributing to limiting access to the bed 103.

SUMMARY

Disclosed embodiments include automotive vehicles with a folding tailgate and folding tailgates for an automotive vehicle.

In a non-limiting embodiment, an illustrative automotive vehicle with a folding tailgate includes a bed, a rail positioned along an edge of the bed, and a folding tailgate at a back of the bed. The folding tailgate includes: a first wall portion and a second wall portion, the first wall portion and the second wall portion being rotatably connected to one another; a first latch attached to the first wall portion; a guide member attached to the first wall portion and configured to move along the rail in a manner that is constrained by the rail; a rotatable latch attached to the second wall portion; and a first hinge attached to the second wall portion and movably attachable to the vehicle.

In another non-limiting embodiment, an illustrative folding tailgate for an automotive vehicle includes a first wall portion and a second wall portion, the first wall portion and the second wall portion being rotatably connected to one another. A first latch is attached to the first wall portion. A guide member is attached to the first wall portion and is configured to move along a rail disposed at a rear of a vehicle, the guide member being configured to move along the rail in a manner constrained by the rail. A rotatable latch is fixedly attached to the second wall portion. A first hinge is attached to the second wall portion and is movably attachable to the vehicle.

In another non-limiting embodiment, another illustrative folding tailgate for an automotive vehicle includes a first wall portion and a second wall portion, the first wall portion and the second wall portion being rotatably connected to one another. A first latch is attached to the first wall portion and is configured to engage with a complementary latch part at a first portion of an automotive vehicle to lock the tailgate in a closed position at the automotive vehicle. A guide member is attached to the first wall portion and is configured to move along a rail disposed at a rear of the automotive vehicle, the guide member being configured to move along the rail in a manner constrained by the rail. A rotatable connection mechanism is attached to the second wall portion and is configured to attach to a second portion of an automotive vehicle, the tailgate being configured to open and close via folding movement of the first wall portion and the second wall portion relative to one another.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 3A-3C are perspective views of another illustrative folding tailgate.

FIG. 6A is a side plan view in partial perspective of an illustrative sliding roller hinge for a folding tailgate.

FIG. 6B is a front plan view of the sliding roller hinge of FIG. 6A.

FIG. 8A is a plan view of an illustrative rotatable latch for a folding tailgate.

FIG. 8B is a perspective view of an illustrative holder for the rotatable latch of FIG. 8A.

FIG. 8C is a perspective view of the rotatable latch of FIG. 8A being held by the holder of FIG. 8B.

Like reference symbols in the various drawings generally indicate like elements.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

Figure 2B:
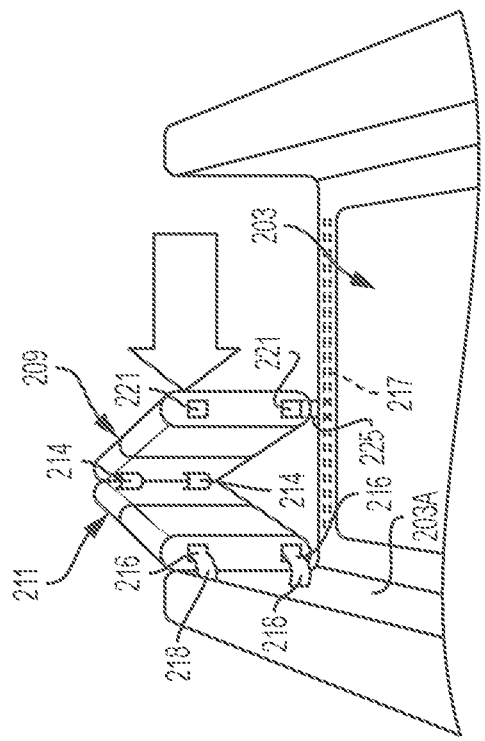
FIGS. 2A and 2B are perspective views of an illustrative folding tailgate.
Figure 2A:
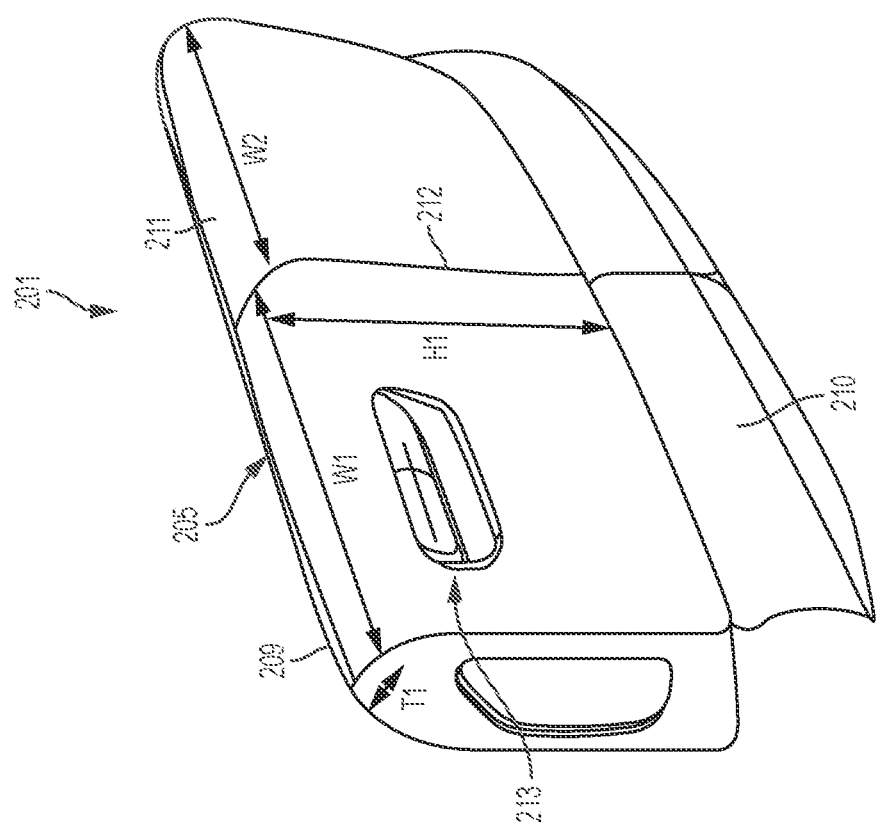

FIGS. 2A and 2B illustrate an illustrative folding tailgate 205 according to the disclosure. In this example, tailgate 205 may have two parts—a first (e.g., sliding) wall portion 209 and a second (e.g., rotating) wall portion 211. The first wall portion 209 and second wall portion 211 are movable relative to one another and connected to one another, e.g., via a centrally located hinge mechanism 214 (e.g., one or more hinges) that joins them, and their movement may be constrained and guided by a guide member 225 connected to the first wall portion 209 at a bottom thereof, e.g., a translating hinge such as a sliding hinge or rolling hinge, e.g., with one or more bearings, for example, that rides in or along a rail or track 217 positioned at a bottom rear edge of the bed 203. The rail or track 217 is shown in dotted line in FIG. 2B since it is hidden from the perspective of the bed 203.

A width W1 of first wall portion 209 in a horizontal side-to-side direction may be the same as a width W2 of the second wall portion 211 in such horizontal direction (left to right direction). First wall portion 209 and second wall portion 211 may also have a same thickness T1 in a front-to-rear direction and a same height H1 in an upright direction (e.g., upright when the tailgate 205 is closed). The dimensions of W1, W2, H1 and T1 may depend on a height and a lateral width of the bed 203 and can be suitably chosen accordingly. For example, for a bed 203 with a width in a range of about 48-72 inches and a height of about 18-30 inches, W1 and W2 may each be in a range of about 24-36 inches, H1 may be in a range of about 18-30 inches, and T1 may be in a range of about 3-6 inches. These dimensions are merely illustrative, and other dimensions may be used. Second wall portion 211 may include one or more brackets 216 that connect to a sidewall 203A of bed 203 via one or more side hinge mechanisms 218 (e.g., one or more hinges). The tailgate 205 and sidewall of the bed 203 may also include a latching mechanism for locking the tailgate 205 in a closed position, e.g., comprising a latch 221 that mates with a complementary latch part at a sidewall of the bed 203. The latch 221 may be controllable by a manual button or other release mechanism at handle 213, or via any suitable powered mechanism, such as an electromechanical actuator.

FIG. 2A shows tailgate 205 in a closed position. In a closed position, first wall portion 209 and second wall portion 211 may contact each other along a split line 212, the split line 212 illustrating a boundary between the first wall portion 209 and the second wall portion 211 when the tailgate 205 is in a closed position. FIG. 2B shows tailgate 205 in a partially open position, as viewed from the bed 203. In an open position, first wall portion 209 and second wall portion 211 may rotate away from each other at a split line 212 via one or more centrally located hinge mechanisms 214 that connect the first wall portion 209 and the second wall portion 211. When open, tailgate 205 may provide access to bed 203. In an open position of tailgate 205, first wall portion 209 may slide along the edge of the bed 203 and rotate away from the bed 203, while the second wall portion 211 rotates away from the bed 203. The first wall portion 209 and second wall portion 211 may fold toward one another in an opening movement such that center-side portions thereof move outward (rearward) from the bed 203, in an accordion-like fashion, thereby opening the tailgate 205 and enabling access to the bed 203 such that the user may have access while standing at a rear bumper 210 of the vehicle 201 instead of having to stand away from the bumper 210.

In the example illustrated in FIGS. 2A and 2B, first wall portion 209 may slide toward the second wall portion 211, while second wall portion 211 may rotate without undergoing sliding motion. In this example, a handle 213 may be positioned on first wall portion 209. In the example illustrated in FIGS. 2A and 2B, first wall portion 209 may be on the left side of the vehicle 201, while second wall portion 211 may be on the right side of the vehicle 201. In another example, first wall portion 209 may be on the right side of the vehicle 201, while second wall portion 211 may be on the left side of the vehicle 201. Two handles 213 may be used—one handle 213 on first wall portion 209, and another handle 213 on second wall portion 211.

Figure 3C:
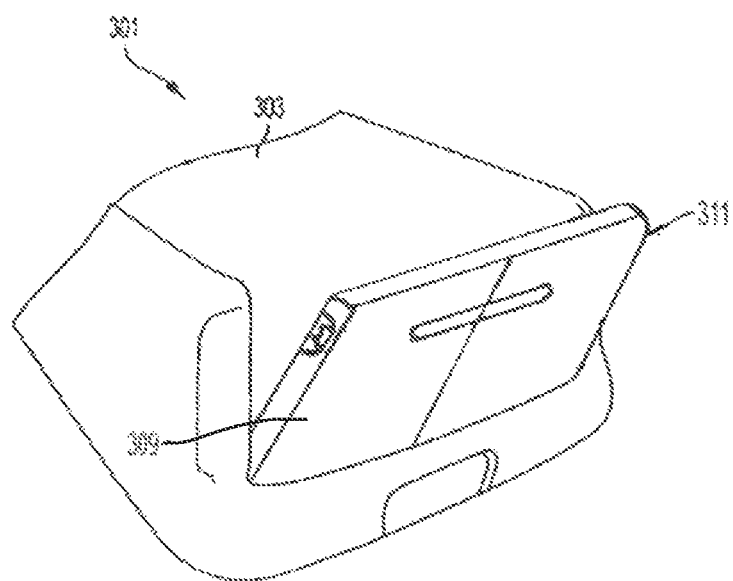

FIGS. 3A, 3B and 3C illustrate an example of a folding tailgate 305 according to the disclosure that is like the illustrative tailgate 205 shown in the example of FIGS. 2A and 2B. Similar to the example of FIGS. 2A and 2B, vehicle 301 may be equipped with a bed 303 and a tailgate 305. Tailgate 305 may be a folding tailgate like that described in the example of FIGS. 2A and 2B. Folding tailgate 305 may have a first wall portion 309 that slides toward an opposing side of vehicle 301 via a rail or track 317, and a second wall portion 311 that rotates without undergoing sliding motion. The first wall portion 309 and second wall portion 311 are movable relative to one another and connected to one another, e.g., via a centrally located hinge mechanism 314 (e.g., one or more hinges) that joins them, and their movement may be constrained and guided by a guide member (not shown), e.g., a translating hinge such as a sliding hinge or rolling hinge with one or more bearings, for example, that rides in or along a rail or track 317 positioned at a bottom rear edge of the bed 303. Tailgate 305 may have a one or more handles 313 located at the center of tailgate 305. FIG. 3A shows tailgate 305 in a closed position. FIG. 3B shows tailgate 305 in an open position in connection with a lateral folding and sliding operation, as viewed from behind the vehicle 301. In an example, to open tailgate 305, first wall portion 309 may rotate from its closed position (position shown in FIG. 3A) and slide laterally in a horizontal direction toward an opposite side the vehicle 301. In this example, second wall portion 311 may rotate from its closed position (position shown in FIG. 3A) but may not undergo sliding motion. In an open position shown in FIG. 3B, access to bed 303 may be unobstructed. With tailgate 305 in an open position, a user may approach the vehicle 301 from the back and have full access to bed 303 while standing at a bumper 310 of the vehicle 301 instead of having to stand away from the bumper 310. Additionally, with tailgate 305 in an open position, an open tailgate may not obstruct a view of a license plate 315. The tailgate 305 may be configured to open with lateral folding and sliding motion as illustrated in FIG. 3B. In addition to opening with the lateral folding and sliding motion as illustrated in FIG. 3B, the tailgate 305 may further open with a downward rotating motion by virtue of hinge mechanisms such as described hereinbelow, i.e., the same tailgate 305 may be configured to open in two different ways depending on the choice of the user by virtue of hinge mechanisms such as described hereinbelow.

Figure 4:
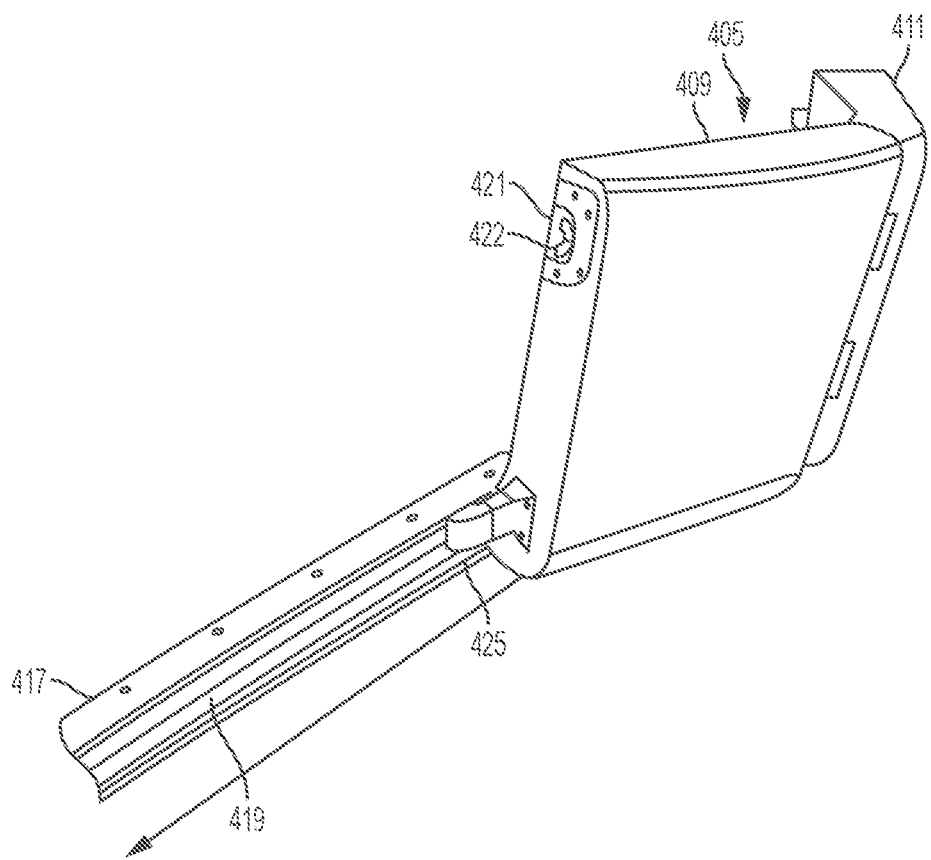
FIG. 4 is a perspective view of an illustrative rail for a folding tailgate.

FIG. 4 illustrates an example of a rail 417 for a folding tailgate 405. Rail 417 may have a groove 419. In an example, a first wall portion 409 may slide toward second wall portion 411. Attached to a left side of the first wall portion 409 may be a first latch 421, e.g., a non-rotatable latch and a guide member 425, e.g., a translating hinge such as a sliding hinge or a rolling hinge. Non-rotatable latch 421 may include a claw 422 that engages with a vertically oriented striker (not shown) located at inner left side of the vehicle so that the tailgate 405 will lock onto the vehicle when tailgate 405 is in a closed position. Claw 422 may be a double claw or single-claw configuration, for example, that is configured to close on striker from the side or the front, depending on operation, and may be configured to close manually or electrically with electromechanical actuation. Claw 422 may be configured such that sufficient clearance is provided relative to a complementary striker on which it latches so that the claw 422 and striker do not jam in a manner that might preclude complete closure of the tailgate 405 when closing laterally from left to right. The latching of the claw 422 on the striker may be accomplished electro-mechanically, or the latching may be provided mechanically, e.g., via a plunger on the tailgate 405 near latch 421 that may press against a mating surface at the side of the vehicle when the tailgate 405 is closed laterally, the plunger being connected to a linkage that closes the claw 422. Non-rotatable latch 421 may unlock from the vehicle when tailgate 405 is in an open position, e.g., via a connector rod of a locking mechanism that is operable via a handle at the tailgate 405. When tailgate 405 is in a closed position, guide member 425 may fit into a reinforced receptacle at the left vehicle wall in order to secure the bottom left portion of the tailgate 405. Guide member 425 may translate away from the left wall of the vehicle when tailgate 405 folds open toward an open position, e.g., by sliding or rolling along the rail 417 during opening. Guide member 425 may have one or more portions 642, e.g., one or more sliding surfaces or one or more rollers, that engage with the groove 419 of rail to enable translation of guide member 425 along the rail 417.

Figure 5A:
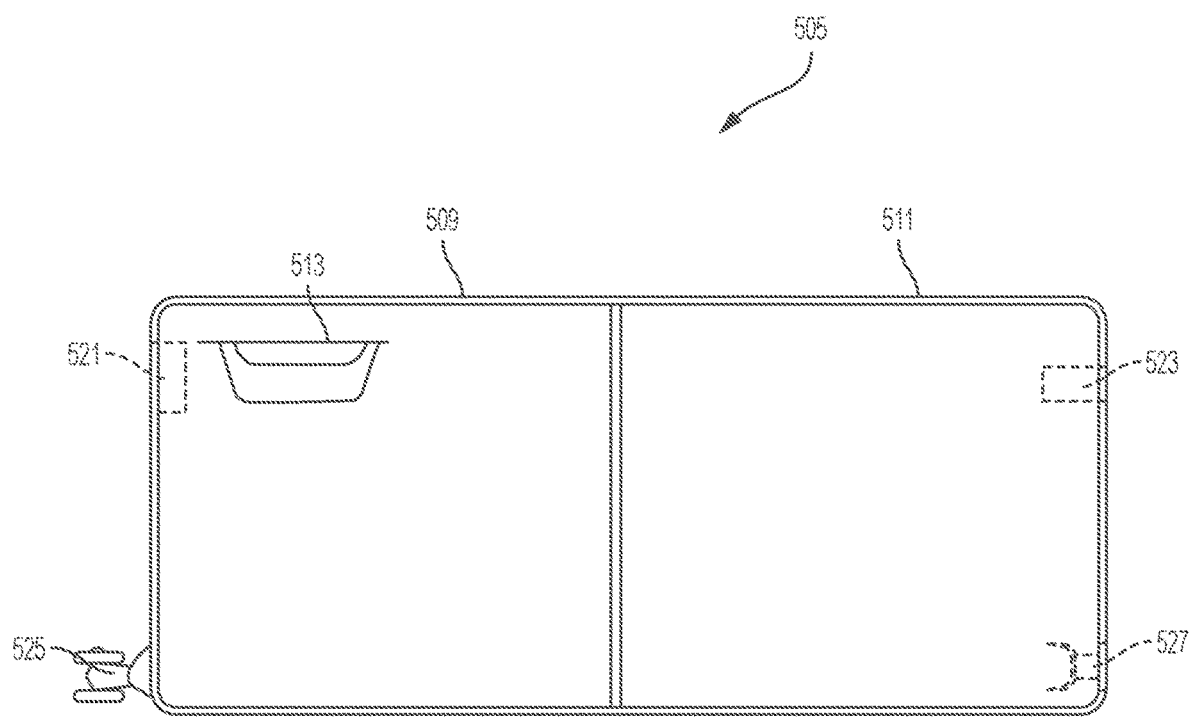
FIG. 5A is a plan view of another illustrative folding tailgate.
Figure 5B:
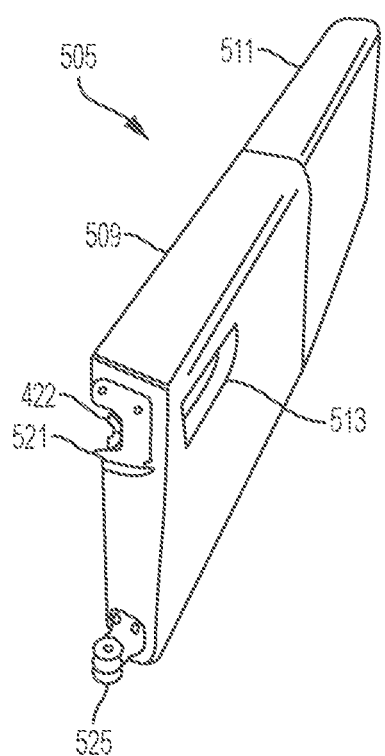
FIG. 5B is a perspective view of the folding tailgate of FIG. 5A.

FIGS. 5A and 5B illustrate another example of a folding tailgate 505 according to the disclosure. In this example, tailgate 505 may have a first wall portion 509 and a second wall portion 511. A handle 513 may be allocated at a first wall portion 509. Tailgate 505 may have four connections with a vehicle, which may include a first latch 521, e.g., a non-rotatable latch, a second latch 523, e.g., a rotatable latch, a guide member 525, e.g., a translating hinge such as a sliding hinge or rolling hinge, and a non-translating hinge 527.

Non-rotatable latch 521 may be located at the upper left portion of the first wall portion 509, which is the translating part of the tailgate 505. Non-rotatable latch 521 may lock onto the vehicle to constrain or lock the tailgate 505 in a closed position. To open the tailgate 505, non-rotatable latch 521 may be unlocked from the vehicle by operating, e.g., depressing, a release lever (not shown) at the handle 513 or by operating an electronic control, e.g., a release button on an electronic vehicle key. When tailgate 505 is in a closed position, non-rotatable latch 521 may be in contact with a complementary locking portion at the vehicle. During opening of the tailgate 505 as a folding tailgate, non-rotatable latch 521 may release from the vehicle.

Rotatable latch 523 may be located at the upper portion of the second wall portion 511, e.g., in a cut-out portion of the tailgate that permits rotatable latch 523 to mate with a complementary connecting portion at the vehicle wall as explained further below. Rotatable latch 523 may lock onto the vehicle to constrain or lock the tailgate 505 in a closed position. To open the tailgate 505 as a folding tailgate, rotatable latch 523 may provide for rotation of the second wall portion 511 with respect to the vehicle and with respect to the first wall portion 509. When tailgate 505 is in a closed position, rotatable latch 523 may be secured to a complementary locking portion at the vehicle. When tailgate 505 is opened laterally as a folding tailgate, rotatable latch 523 may remain secured to the vehicle.

Guide member 525 may be located at the bottom portion of the first wall portion 509. Guide member 525 may fit into a distal portion of a rail or may fit into a reinforced receptacle at the vehicle when tailgate 505 is in a closed position. When tailgate 505 is in an opened laterally as a folding tailgate, guide member 525 may disengage from a distal end of the rail in which it rides or from a reinforced receptacle at the vehicle. When tailgate 505 opens laterally as a folding tailgate, guide member 525 may translate along the edge of the bed of the vehicle, and guide member 525 may maintain contact with the rail of the vehicle in which it rides.

Non-sliding hinge 527 may be located at the bottom portion of the second wall portion 511. Non-sliding hinge 527 may be connected to the vehicle when tailgate 505 is closed. Non-sliding hinge 527 may be rotatably connected to the vehicle when tailgate 505 is open as a folding tailgate. When tailgate 505 is open as a folding tailgate, non-sliding hinge 527 may maintain contact with the vehicle.

When tailgate 505 is operated to open and close laterally in a folding manner as described above, sliding hinge 525 may move along the rail toward non-sliding hinge 527, and non-rotatable latch 521 may move toward rotatable latch 525. Second wall portion 511 may rotate about the axis connecting rotatable latch 523 and non-sliding hinge 527. Sliding part 509 may rotate about the axis connecting non-rotatable latch 521 and sliding hinge 525, while maintaining connection to second wall portion 511, which may force first wall portion 509 to move toward second wall portion 511.

Figure 1:
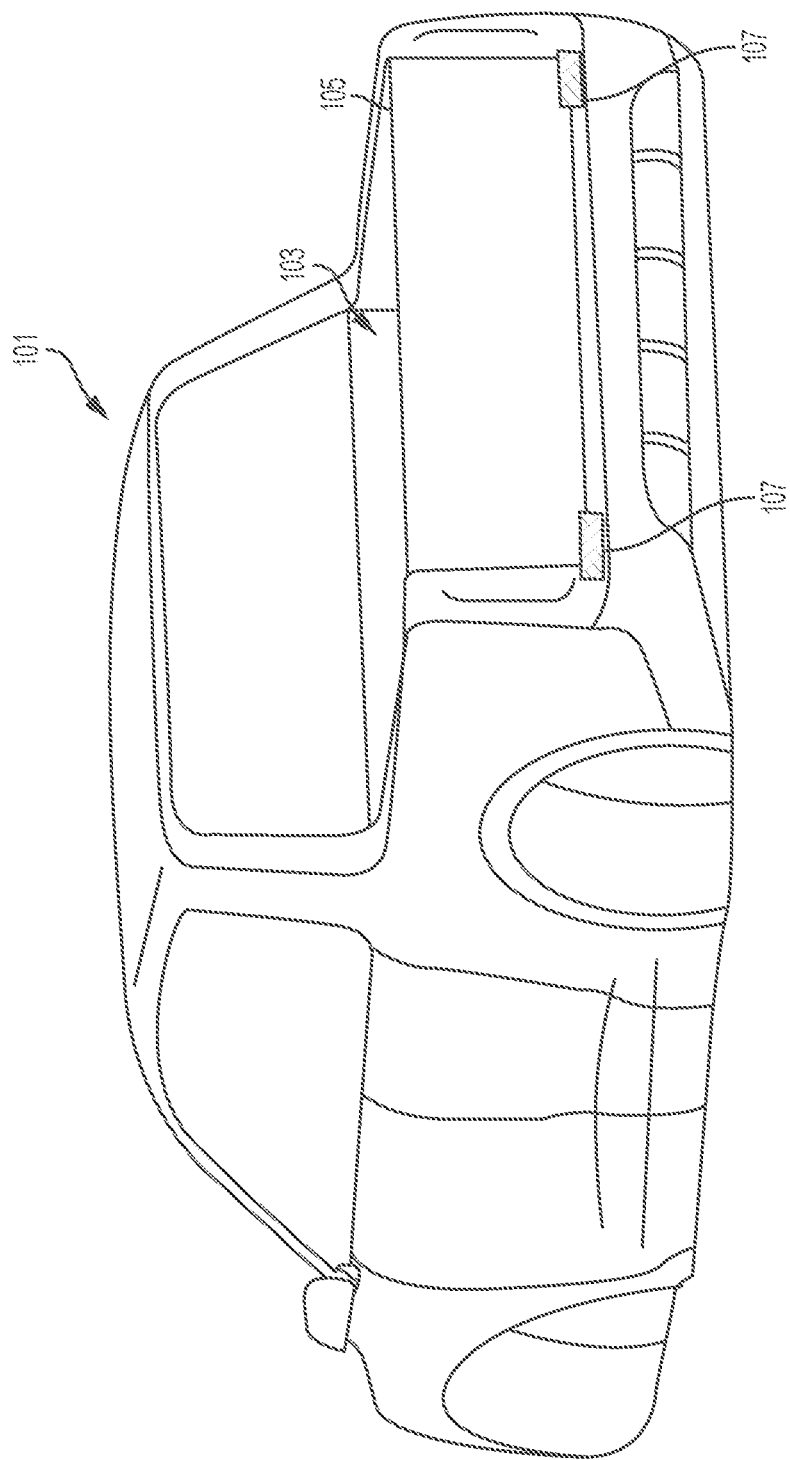
FIG. 1 is a perspective view of a vehicle with a conventional tailgate.

Additionally, sliding hinge 525 and non-sliding hinge 527 may be configured to permit tailgate 505 to open as a hinged tailgate in an up-and-down manner (e.g., similar to a conventional tailgate shown in FIG. 1) in addition to opening as a laterally folding tailgate as described above. When tailgate 505 opens downward as a hinged tailgate, first wall portion 509 and second wall portion 511 may move as an interconnected unit, their planes remaining oriented in an upright direction. First wall portion 509 and second wall portion 511 may be configured to lock together at the surfaces where they join when closed, e.g., via any suitable releasable latching mechanism (e.g., which may be released by handle 513 when operated in a laterally folding manner) in order to further secure first and second wall portions 509 and 511 together when operated as a downward opening rotating tailgate, if desired. When tailgate 505 is opened downward as a hinged tailgate, non-rotatable latch 521 and rotatable latch 523 may separate from the vehicle. When tailgate 505 opens as a hinged tailgate, sliding hinge 525 and non-sliding hinge 527 may maintain contact with the vehicle. When tailgate 505 opens downward as a hinged tailgate, sliding hinge 525 and non-sliding hinge 527 may allow for rotation of tailgate 505 around the axis connecting sliding hinge 525 and non-sliding hinge 527.

Therefore, the combination of non-rotatable latch 521, rotatable latch 523, sliding hinge 525, and non-sliding hinge 527 may allow for tailgate 505 to operate both as a laterally folding tailgate and as a hinged tailgate, such as illustrated in FIGS. 3B and 3C. This design may help contribute to allowing for a combination of benefits of each design. When tailgate 505 opens as a folding tailgate, an unobstructed access to the bed of the vehicle may be provided. Furthermore, an unobstructed view of the license plate may be provided. When tailgate 505 opens as a hinged tailgate, it may provide for additional seating area and for a support surface for placement or removal of items to or from the bed of the vehicle. Separate control buttons or releases may be provided at the handle(s) 513 of the tailgate 505 so as to control which mode of opening/closing—lateral folding or up-and-down hinged motion—as desired.

FIGS. 6A and 6B illustrate an example of a sliding hinge 625, made of a suitable metal alloy such as steel, for example, for a folding tailgate, which may be located at position of sliding hinge 525 of FIGS. 5A and 5B. Sliding hinge 625 may have a support plate 631 that attaches to the tailgate with fasteners 655, such as screws, bolts, rivets, welds, or any suitable fastener. There may be one, or two, or three, or a larger number of fasteners 655. For example, in some embodiments four fasteners may be used. Support plate 631 may be connected to a stationary shaft 633 of the sliding hinge 625. Sliding hinge 625 may have a rotatable shaft 635, which may be connected to the stationary shaft 633 using a swivel joint 637. A distal portion 639 of rotatable shaft 635, e.g., which may have a second diameter smaller than that of the rotatable shaft 635 closer to the swivel joint 637 and which may protrude longitudinally along a rotation axis of the of the rotatable shaft 635, may carry a slider 641, e.g., which may protrude perpendicularly from the longitudinal direction (rotational axis) of rotating shaft 635.

When the tailgate is operated as a laterally folding tailgate, slider 641 inserted into the rail of the tailgate may slide along the groove of the rail. The slider 641 may have contact surfaces 642 that ride along such groove. The slider 641 may also carry rollers such as shown in FIGS. 5A and 5B at 525.

When the tailgate is operated as a hinged tailgate that rotates downward to open, rotatable shaft 635 may rotate in the direction shown by the arrow in FIG. 6A with respect to the stationary shaft 633 around the swivel joint 637.

Figure 7A:
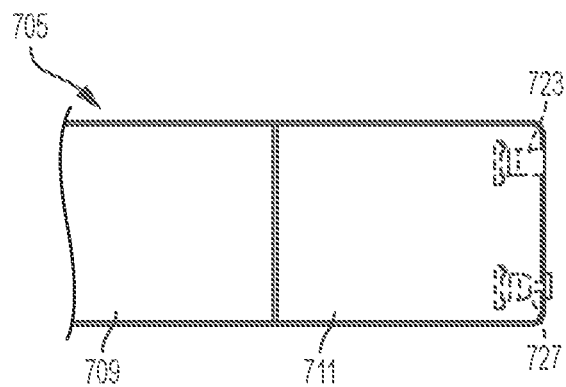
FIG. 7A is a plan view of an illustrative rotatable latch for a folding tailgate.
Figure 7B:
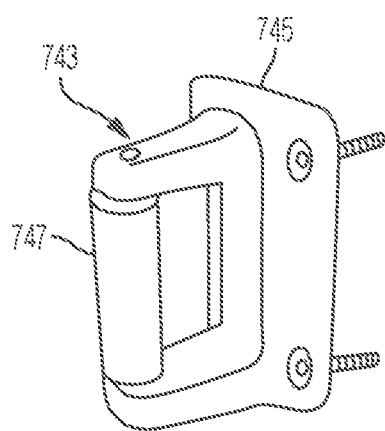
FIG. 7B is a perspective view of an illustrative holder for the rotatable latch of FIG. 7A.
Figure 7C:
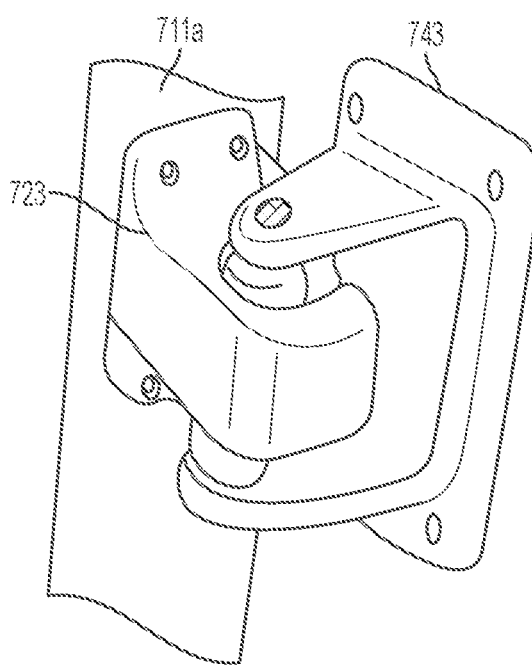
FIG. 7C is a perspective view of the rotatable latch of FIG. 7A being held by the holder of FIG. 7B.

FIGS. 7A, 7B, and 7C illustrate an example of a rotatable latch 723, which may be positioned near an upper right corner of folding tailgate 705. Rotatable latch 723 may be fixedly attached to a second wall portion 711a, e.g., inset from an outer edge of right side of tailgate 705. First wall portion 709 may be connected to second wall portion 711 such as described previously herein. Rotatable latch 723 may be engaged with a rotatable latch holder 743. Rotatable latch holder 743 may be fixedly attached to the vehicle, e.g., with fasteners such as described elsewhere herein. Rotatable latch holder 743 may have a roller housing 745 and a roller 747 or striker to which rotatable latch 723 connect as discussed further in connection with FIGS. 8A-8C. A non-sliding hinge 727 may be provided below rotatable latch 723 at a same side of the second wall portion 711 and adjacent to a bottom edge of the second wall portion 711.

FIGS. 8A, 8B, and 8C illustrate an example of a rotatable latch 823 for a folding tailgate. Rotatable latch 823 may engage with a rotatable latch holder 843. Rotatable latch holder 843 may have a roller housing 845 and a roller 847 or striker. Rotatable latch holder 843 may have two or more bolts 849 for fastening to the vehicle. Rotatable latch 823 may have a stud bolt 851 which when extended (as shown in FIGS. 8A and 8C) permits the rotatable latch 823 to be locked. When rotatable latch 823 is locked, tailgate may open as a laterally folding tailgate, but may not open downwardly as a hinged tailgate. When stud bolt 851 is retracted (not shown), the rotatable latch 823 may be unlocked. When rotatable latch 823 is unlocked, tailgate may open downwardly as a hinged tailgate. Rotatable latch 823 may have a nose portion 857 and a bridge portion 859 attached to a base portion 861. Rotatable latch 823 may have a latch housing 863 and a plunger 865 that cooperates with a lock 867 to lock and release rotatable latch 823, e.g., via a linkage operated by a handle such as handle 313/513, or the latch may be operated electrically with electromechanical actuation.

Figure 9:
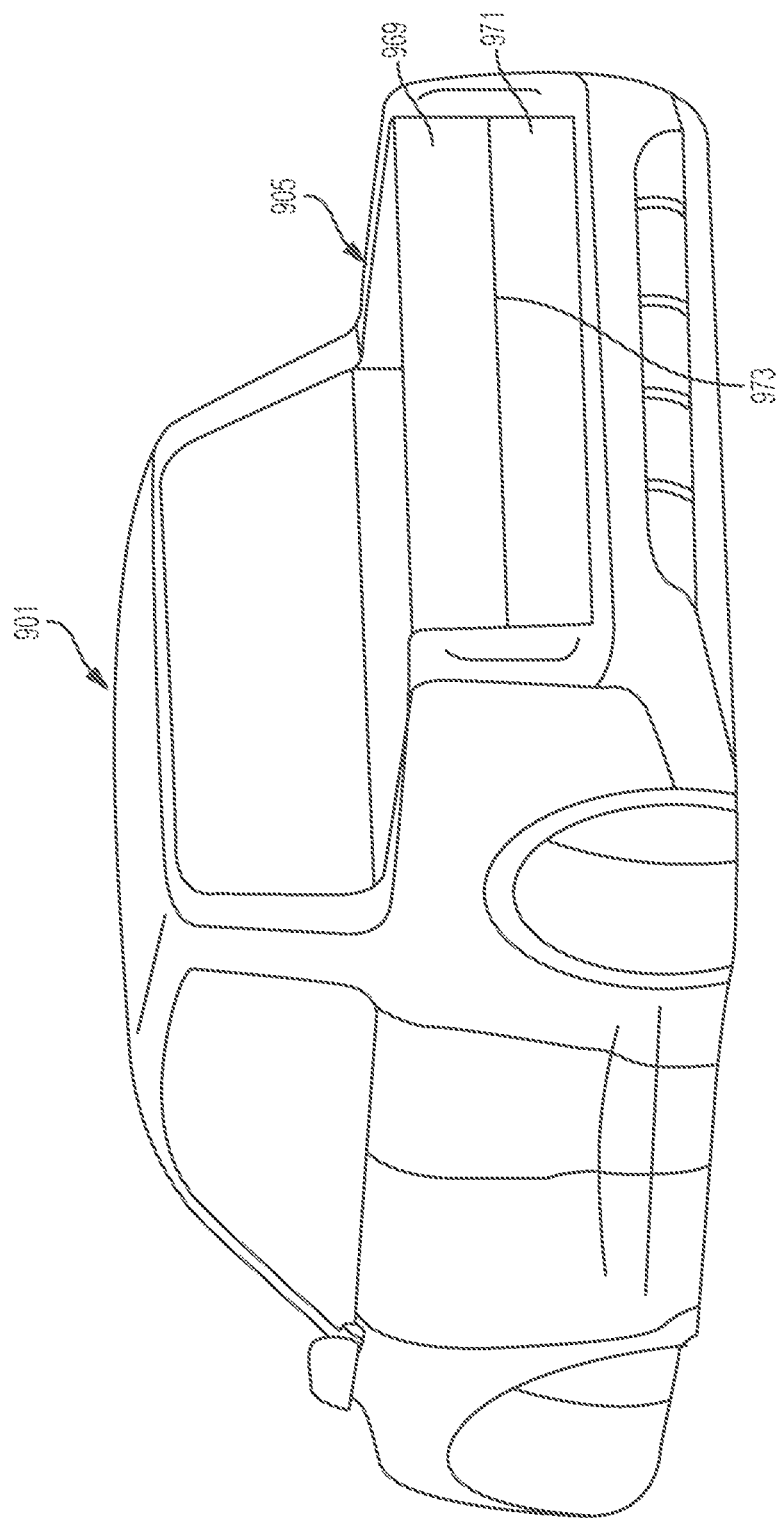
FIG. 9 is a perspective view of a vehicle with an illustrative tailgate.

FIG. 9 illustrates another example of a folding tailgate 905. In an example, tailgate 905 for a vehicle 901 may have a transverse first (e.g., sliding) wall portion 969 and a transverse second (e.g., rotating) wall portion 971. In this example, a split line 973 between the transverse sliding first wall portion 969 and the transverse rotating second wall portion 971 may be horizontal. In this example, when the tailgate 905 opens as a folding tailgate, the tailgate 905 may open downward such that the top edge of the transverse sliding part 969 may stay over the bottom edge of the transverse rotating second wall portion 971.

Various disclosed tailgates may have a hinge at the midpoint to allow the structure to fold in half and slide along a railing along the plane perpendicular to the fold. It also can hinge along the railing, like a traditional tailgate. Each of the four corner hinges may have separate boundary conditions. One may release for traditional tailgate drop and for sliding motion. Another may release for traditional tailgate drop and rotate during sliding motion. Another may hinge for traditional drop and release and slide laterally. Another may hinge for traditional drop and rotate during sliding motion. In addition, another example could have the system slide up and down instead of left and right. The movement of the tailgate in this manner may help contribute to increasing the ease of access to the truck bed, but more specifically may help contribute to preventing obstruction from the bed storage bin. Because such a tailgate slides, it could easily be moved with one hand, like the sliding door on a minivan.

The rolling mechanisms and hinges can be made from suitable materials such as steel, aluminum alloy, composite materials, plastics, and combinations thereof selected for their performance related to various factors such as, without limitation, potential wear and tear, forces to which they may be subjected, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated. In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. Additional features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

While the disclosed subject matter has been described in terms of illustrative embodiments, it will be understood by those skilled in the art that various modifications can be made thereto without departing from the scope of the claimed subject matter as set forth in the claims.

What is claimed is:

1. A tailgate for an automotive vehicle, the tailgate comprising:
    a wall portion;
    a translating hinge attached to the wall portion, the translating hinge being adapted to (1) move along a guide, positioned along an edge of a bed of the automotive vehicle, in a manner that is constrained by the guide and (2) rotate the wall portion into a hinged open position relative to a bed of the automotive vehicle; and
    a non-rotatable latch adapted to connect the wall portion to a side of the automotive vehicle and (1) release, under a first condition, the non-rotatable latch from the side to allow the tailgate to rotate to the hinged open position and (2) release, under a second condition, the non-rotatable latch and the translating hinge from the side to allow the wall portion to move along the guide.

2. The tailgate of claim 1, further comprising a second wall portion rotatably connected to the wall portion, the wall portion and the second wall portion being adapted to fold together while the translating hinge moves along the guide toward a side of the automotive vehicle.

3. The tailgate of claim 2, further comprising at least one hinge rotatably connecting the wall portion to the second wall portion, the at least one hinge adapted to fold the wall portion and the second wall portion together toward the side of the automotive vehicle.

4. The tailgate of claim 1, wherein the guide is selected from one of a rail and a track adapted to constrain translation of the translating hinge thereto.

5. The tailgate of claim 1, wherein the translating hinge comprises a stationary shaft having an axis, a rotatable shaft having the same axis, a swivel joint, and a slider.

6. The tailgate of claim 1, further comprising:
    the non-rotatable latch adapted to connect a corner of the wall portion to the side of the automotive vehicle; and
    a handle adapted to (1) release, under the first condition, the non-rotatable latch from the side to allow the tailgate to rotate to the hinged open position and (2) release, under the second condition, the non-rotatable latch and the translating hinge from the side to allow the wall portion to move along the guide.

7. The tailgate of claim 1, wherein the guide comprises a groove adapted to receive a portion of the translating hinge chosen from a slider and a roller.

8. A tailgate for an automotive vehicle, the tailgate comprising:
    a first wall portion;
    a second wall portion rotatably connected to the first wall portion, the first wall portion and the second wall portion being adapted to fold together toward a side of the automotive vehicle;
    and a non-rotatable latch adapted to connect the first wall portion to a side of the automotive vehicle and (1) release, under a first condition, the non-rotatable latch from the side to allow the tailgate to rotate to the hinged open position and (2) release, under a second condition, the non-rotatable latch and a translating hinge from the side to allow the first wall portion to move along the guide.

9. The tailgate of claim 8, further comprising a translating hinge attached to the first wall portion, the translating hinge being adapted to (1) move along a guide, positioned along an edge of a bed of the automotive vehicle, in a manner that is constrained by the guide and (2) rotate the first wall portion into a hinged open position relative to a bed of the automotive vehicle.

10. The tailgate of claim 9, wherein the guide is selected from one of a rail and a track adapted to constrain translation of the translating hinge thereto.

11. The tailgate of claim 8, further comprising a rotatable latch adapted connected to a corner of the second wall portion, the rotatable latch adapted to (1) release the second wall portion and allow the second wall portion to rotate, relative to the side of the automotive vehicle, while the first wall portion and the second wall portion fold together toward the side of the automotive vehicle, (2) release the second wall portion, from the side of the automotive vehicle, into a hinged open position, and (3) hold the second wall portion, relative to the side of the automotive vehicle, in a closed position.

12. The tailgate of claim 11, wherein the rotatable latch comprises a roller housing and a roller.

13. The tailgate of claim 11, further comprising:
    a translating hinge attached to the first wall portion, the translating hinge being adapted to (1) move along a guide, positioned along an edge of a bed of the automotive vehicle, in a manner that is constrained by the guide and (2) rotate the first wall portion into a hinged open position relative to a bed of the automotive vehicle;
    the non-rotatable latch adapted to connect a corner of the first wall portion to another side of the automotive vehicle; and
    a handle adapted to (1) release, under a first condition, the non-rotatable latch and the rotatable latch to allow the tailgate to rotate to the hinged open position and (2)

release, under a second condition, the non-rotatable latch and translating hinge to allow the first wall portion and the second wall portion to fold together toward the side of the automotive vehicle.

14. The tailgate of claim 8, further comprising at least one hinge rotatably connecting the first wall portion to the second wall portion, the at least one hinge adapted to fold the first wall portion and the second wall portion together toward the side of the automotive vehicle.

15. A vehicle, comprising
a guide positioned along an edge of the bed; and
a tailgate, comprising:
a wall portion,
a translating hinge attached to the wall portion, the translating hinge being adapted to (1) move along the guide in a manner that is constrained by the guide and (2) rotate the wall portion into a hinged open position relative to a bed of the automotive vehicle; and
a non-rotatable latch adapted to connect the wall portion to a side of the automotive vehicle and (1) release, under a first condition, the non-rotatable latch from the side to allow the tailgate to rotate to the hinged open position and (2) release, under a second condition, the non-rotatable latch and the translating hinge from the side to allow the wall portion to move along the guide.

16. The vehicle of claim 15, wherein the tailgate further comprises a second wall portion rotatably connected to the wall portion, the wall portion and the second wall portion being adapted to fold together while the translating hinge moves along the guide toward a side of the automotive vehicle.

17. The vehicle of claim 16, wherein the tailgate further comprises at least one hinge rotatably connecting the wall portion to the second wall portion, the at least one hinge adapted to fold the wall portion and the second wall portion together toward the side of the automotive vehicle.

18. The vehicle of claim 15, wherein the guide is selected from one of a rail and a track adapted to constrain translation of the translating hinge thereto.

19. The vehicle of claim 15, wherein the translating hinge comprises a stationary shaft having an axis, a rotatable shaft having the same axis, a swivel joint, and a slider.

20. The vehicle of claim 15, wherein the tailgate further comprises:
the non-rotatable latch adapted to connect a corner of the wall portion to the side of the automotive vehicle; and
a handle adapted to (1) release, under the first condition, the non-rotatable latch from the side to allow the tailgate to rotate to the hinged open position and (2) release, under the second condition, the non-rotatable latch and the translating hinge from the side to allow the wall portion to move along the guide.

* * * * *